(No Model.)

W. F. BORN.
PIPE WRENCH.

No. 539,031. Patented May 14, 1895.

Witnesses:
C. F. Blake
W. C. Johnson

Inventor:
Walter F. Born
By Wm Johnson
Atty.

THE NORRIS PETERS CO., PHOTO-LITHO., WASHINGTON, D. C.

UNITED STATES PATENT OFFICE.

WALTER F. BORN, OF CHICAGO, ILLINOIS.

PIPE-WRENCH.

SPECIFICATION forming part of Letters Patent No. 539,031, dated May 14, 1895.

Application filed January 2, 1895. Serial No. 533,667. (No model.)

*To all whom it may concern:*

Be it known that I, WALTER F. BORN, a citizen of the United States, residing at Chicago, in the county of Cook and State of Illinois, have invented certain new and useful Improvements in Adjustable Pipe-Wrenches; and I do hereby declare the following to be a full, clear, and exact description of the invention, such as will enable others skilled in the art to which it appertains to make and use the same.

My invention relates to improvements in adjustable pipe wrenches, which are also adapted to be used upon the nuts of bolts.

The object of the invention is to provide a strong and durable wrench convenient to operate, and readily adjustable to the desired size of pipe, and which is adapted to be manufactured at comparatively small cost, and repaired without undue expense.

The novel features of the invention are hereinafter described and set forth, reference being had to the accompanying drawings, in which—

Figure 1:
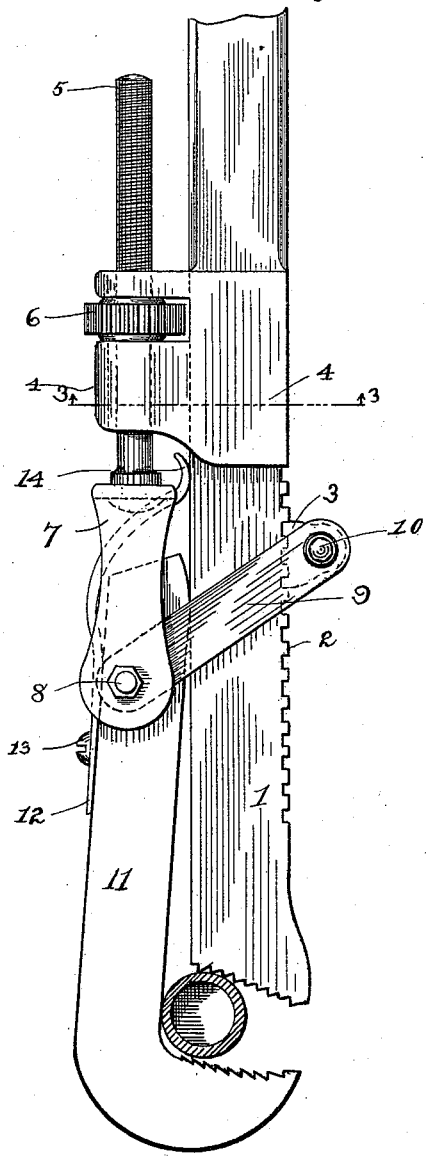
Figure 3:
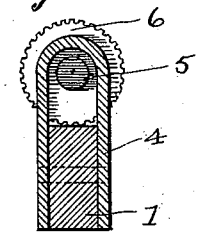
Figure 4:
Figure 2:
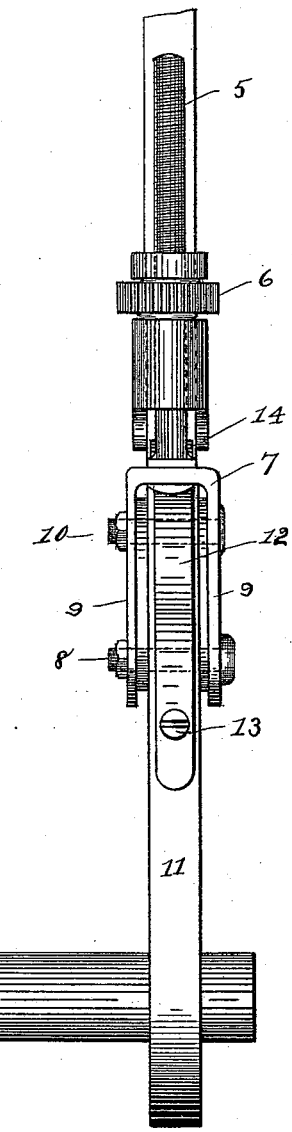

Figure 1 is a side elevation of my improved wrench applied to a pipe; Fig. 2, a plan view of the same. Fig. 3 is a transverse section taken on the line 3 of Fig. 1, and Fig. 4 is a detached end view of the toothed adjusting-dog.

In the drawings: 1 designates the wrench-lever or jaw bar, made of steel, or iron faced with steel at the jaw end, at the outer end of which (not shown) is formed a handle, or if preferred may be provided with a wooden handle. The end to engage the pipe or nut is widened beyond the normal width of the bar, and cut to an oblique angle, and is serrated in the usual manner. Said bar has tooth projections 2, formed or cut upon the lower side, into which an adjusting block or dog 3, is adapted to be fitted, and is provided with a U shaped band 4, formed integral with said bar or rigidly attached thereto. Said band forms a box for the adjustment screw 5, and is transversely slotted for the milled nut 6 upon said screw, and is adapted to sustain the strain upon the screw thereon. Said screw has a yoke-strap 7, rigidly secured to its front end, or formed integral therewith. Said yoke-strap is perforated for a bolt 8, upon which is suspended within the yoke-strap jaw the upper ends of two connecting link straps 9, one upon either side of the jaw-bar. The lower ends of said link-straps are connected to the toothed adjusting block by means of the bolt 10 passing therethrough. Said adjusting block is provided with tooth projections which fit into the spaces of like tooth projections upon the lever jaw-bar, the strain upon the links being held thereby. The contact face of the adjusting block is of sufficient size to prevent its toppling over when the links are at their greatest angle.

11 is a hook jaw-bar formed of like material with the lever-jaw-bar, and serrated upon the inner hook face thereof. Said hook-bar rests upon the top of the lever-jaw-bar, and is adapted to grasp the pipe between said inner face and the end of the lever-jaw-bar and is perforated near its upper or opposite end to receive the yoke-strap bolt 8 between the link-straps thereon. Said hook-jaw-bar is rounded off on the under side from said perforation to the end as shown.

12 is a flat steel spring secured to the top of the hook-jaw-bar by the screw 13, the free end of which 14, rests upon the top of the lever-jaw-bar. Said spring is adapted to throw the hook end portion of the hook-bar down upon the top of the lever-bar when the wrench is not in use, and to lift the opposite end to hold the link-straps to their adjustment, sufficient play being allowed the screw through the slotted U strap of the bar for this purpose.

The action of the wrench will be readily understood from an inspection of the drawings.

It will be observed that the adjustment screw takes but a portion of the gripping strain the balance being sustained by the connecting links, by which the pivoted toothed adjusting block is supported, and which forms a fulcrum for the lever-jaw-bar to force the oblique serrated end of the bar against the pipe, the serrated face and under side of the hook-bar holding in the opposite direction. The wrench instantly releases its hold when moved in the direction to take a new hold, and in turning a hexagon nut it is not necessary to remove the wrench, so long as the nut is frictionally tight upon the bolt, as the wrench readily passes the corners of the nut in its backward action, and closes itself again to grasp the nut. When the wrench is not in use the spring end of the hook-jaw-bar is lifted from the lever-bar, by said spring and to move the adjusting block to a new position, only requires the pressing down of said spring end of the hook-jaw-bar, thereby compressing said spring, when the block may be readily moved to the desired point as determined by the size of the pipe to be operated upon, the screw being operated to place the link-straps in a holding angle approximate to that shown in the drawings, and for the finer adjustment required for the gripping bite. The general form of the wrench adapts it for use in places difficult to get at by some other styles of wrenches, and gives it great strength and holding power.

Having described my invention, I claim—

1. In a wrench the combination with the described lever-jaw-bar of a hook-jaw-bar, connected to said lever-bar by means of link-straps, pivotally attached at one end to said hook-bar, and at the other end pivotally attached to a toothed adjusting block, adapted to fit into the spaces formed by the tooth-projections upon said lever-bar; said hook-jaw-bar provided with a spring, substantially as and for the purpose described.

2. The combination in the described wrench of a lever jaw-bar, adapted to form the handle of the wrench; said bar provided with tooth projections upon one side thereof, and with a U shaped strap rigidly secured thereto or formed integral therewith, an adjusting screw and nut inserted in said "U" shaped strap, a hook jaw-bar provided with a spring adapted to lift one end of said hook jaw-bar, link straps pivotally attached at one end to said hook jaw-bar and to said adjusting screw, and the other ends of said link straps pivotally attached to an adjusting block or dog provided with tooth projections adapted to engage the like tooth projections upon the lever jaw-bar combined in the manner and for the purpose substantially as shown and described.

In testimony whereof I affix my signature in presence of two witnesses.

WALTER F. BORN.

Witnesses:
WILLIAM JOHNSON,
JAMES McCUTCHEON.